United States Patent
Morrison et al.

(10) Patent No.: US 9,401,920 B2
(45) Date of Patent: Jul. 26, 2016

(54) BLACK CORE NETWORK SYSTEM AND METHOD

(71) Applicant: Raytheon Company, Waltham, MA (US)

(72) Inventors: Dennis A. Morrison, Hampstead, NH (US); Donald L. Chaloupka, Wakefield, RI (US); Nicholas R. Desany, Melrose, MA (US); Allan R. Peckham, Exeter, RI (US)

(73) Assignee: Raytheon Company, Waltham, MA (US)

( * ) Notice: Subject to any disclaimer, the term of this patent is extended or adjusted under 35 U.S.C. 154(b) by 191 days.

(21) Appl. No.: 14/073,436

(22) Filed: Nov. 6, 2013

(65) Prior Publication Data

US 2015/0124960 A1     May 7, 2015

(51) Int. Cl.
*H04K 1/00* (2006.01)
*H04L 29/06* (2006.01)
*H04L 29/14* (2006.01)

(52) U.S. Cl.
CPC .............. *H04L 63/105* (2013.01); *H04L 69/40* (2013.01)

(58) Field of Classification Search
CPC ............................ H04L 63/105; H04L 69/40
USPC .......................................................... 380/28
See application file for complete search history.

(56) References Cited

U.S. PATENT DOCUMENTS

| | | | | |
|---|---|---|---|---|
| 4,392,241 | A * | 7/1983 | Hurst | H04K 1/00 380/33 |
| 7,308,713 | B1 * | 12/2007 | Jardin | H04L 41/0677 709/223 |
| 2003/0028625 | A1 | 2/2003 | Sanjeev et al. | |
| 2003/0088698 | A1 | 5/2003 | Singh et al. | |
| 2005/0210139 | A1 | 9/2005 | Hightower et al. | |
| 2005/0283566 | A1 * | 12/2005 | Callaghan | G06F 12/1408 711/104 |
| 2006/0213766 | A1 | 9/2006 | You | |
| 2007/0263532 | A1 | 11/2007 | Mirtorabi et al. | |
| 2009/0019281 | A1 | 1/2009 | Winslow | |
| 2009/0219938 | A1 | 9/2009 | So | |
| 2010/0185753 | A1 | 7/2010 | Liu et al. | |
| 2013/0163412 | A1 | 6/2013 | Hughes et al. | |
| 2014/0075025 | A1 | 3/2014 | Stanforth et al. | |
| 2014/0313882 | A1 | 10/2014 | Rucker et al. | |

(Continued)

OTHER PUBLICATIONS

U.S. Appl. No. 14/516,762, filed Oct. 17, 2014, Systems and Methods for Server and Switch Failover in a Black Core Network.

(Continued)

*Primary Examiner* — Mohammad W Reza
(74) *Attorney, Agent, or Firm* — Schwegman Lundberg & Woessner, P.A.

(57) ABSTRACT

In a network having an encryptor device having an encryption module, a plaintext interface and a ciphertext interface, wherein the encryption module encrypts data transferred from the plaintext interface to a black network through the ciphertext interface and decrypts data transferred from the ciphertext interface to a plaintext network through the plaintext interface, wherein the plaintext interface can be connected through the plaintext link to a plaintext network and wherein the ciphertext interface can be connected through a ciphertext link to a black network, a system and method for reflecting a link failure. A link failure is detected at the ciphertext interface and the link failure is reflected to the plaintext interface.

17 Claims, 17 Drawing Sheets

(56) References Cited

U.S. PATENT DOCUMENTS

2015/0023352 A1 1/2015 Yang et al.
2015/0350059 A1 12/2015 Chunduri et al.

OTHER PUBLICATIONS

Boland, Rita, "Marines Revolutionize Network in Southwest Afghanistan", Signal Magazine [online]. (May 2011), 6 pgs.

Carr, David F., "Building a protective black core for the Global Information Grid", [online]. Defense Systems. Retrieved from the Internet: <URL: http://defensesystems.com/Articles/2009/09/02/Cyber-Defense-Black-Core.aspx?p=1>, (Sep. 9, 2009), 3 pgs.

Morrison, Dennis A., et al., "Systems and Methods for Server and Switch Failover in a Black Ore Network", U.S. Appl. No. 14/516,762, filed Oct. 17, 2014, 47 pgs.

Tarr, Julie, et al., "Defining the Gig Core", *IAnewsleter*, vol. 11, No. 2, (Summer 2008), 4-9.

Walker, Amy, "Uncovering the colorless core of the Army's network", [online]. [archived May 13, 2012]. Retrieved from the Internet: <URL: https://web.archive.org/web/20120513015526/http://www.army.mil/article/78976/>, (May 1, 2012), 3 pgs.

"U.S. Appl. No. 14/516,762, Non Final Office Action mailed Mar. 1, 2016", 5 pgs.

* cited by examiner

BLACK CORE NETWORK SYSTEM AND METHOD

GOVERNMENT RIGHTS

This invention was made with Government support under Government Contract Number N00024-05-C-5346, awarded by the Department of Defense. The Government has certain rights in this invention.

BACKGROUND

The promise of the black core network has eluded tactical network designers for years. Stymied by the lack of infrastructure support, immature technology and politics, many initiatives have witnessed limited success or have failed outright. A key component in the realization of a black core network is an encryptor such as the High Assurance Internet Protocol Encryptor (HAIPE). A HAIPE device typically serves as a secure gateway which, when paired with another HAIPE device, allows two enclaves to exchange data over an untrusted or lower-classification network. It is customary to refer to the user networks that operate within each enclave as plaintext (PT) or red networks, while a black network is one that transports encrypted traffic, or black traffic. Black networks are also known as Ciphertext (CT) networks. Although existing HAIPE devices have been used successfully to bulk encrypt data on a point-to-point basis, to date they lacked the ability to fully support a Black Core network.

Fault tolerance is an issue in pure black core networks. Because of that, successful black core networks to date have been limited to networks of networks based on striping techniques. One such striping approach is described by Tarr et al. in "Defining the GIG Core", http://iac.dtic.mil/csiac/download/Vol11_No2.pdf. Striped cores, however, are more complicated, driving up the cost of the network, increasing latency, increasing vulnerability to eavesdropping and decreasing reliability.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The ability to carry multiple classification levels on a single Internet Protocol (IP) network is the promise of the "Black Core" network. As noted above, while HAIPE devices have been used successfully to bulk encrypt data on a point-to-point basis, until recently, they lacked the basic building blocks required to support a Black Core Network. Capabilities such as bandwidth beyond 1 Gb/s, support for basic routing protocols, and the ability to route multicast traffic have only recently been introduced.

Transporting classified (Red) data over an unclassified (Black) network requires a transformation of Red data into Black data through the use of an encryption device (e.g. a High Assurance Internet Protocol Encryptor (HAIPE)). Once encrypted, the classified data can be co-mingled and routed over the Black network from source to destination. This is the basis and key to creating the Black Core Network. However, simply encrypting data and transporting it from source to destination does not fulfill the requirements of a Black Core network.

A true Black Core network should be able to provide ample bandwidth to carry ordinary unclassified traffic and encrypted (black) traffic, should be able to operate seamlessly in both the Black and Red domains providing low latency point-to-point and point-to-multipoint communications, should be able to self-heal in the event of an equipment malfunction or a link failure and should be able to provide network management in both the Red and Black portions of the network.

While the technology to encrypt IP traffic at various classification levels has existed since the early 2000s, the capability to rapidly and dynamically reroute data around network faults in the both the Black Core and at the interface of the Red Network was not possible. What is described below is a set of cooperative signaling mechanisms between the black core and the red network that can be used separately or together to facilitate rapid failover.

Figure 1:
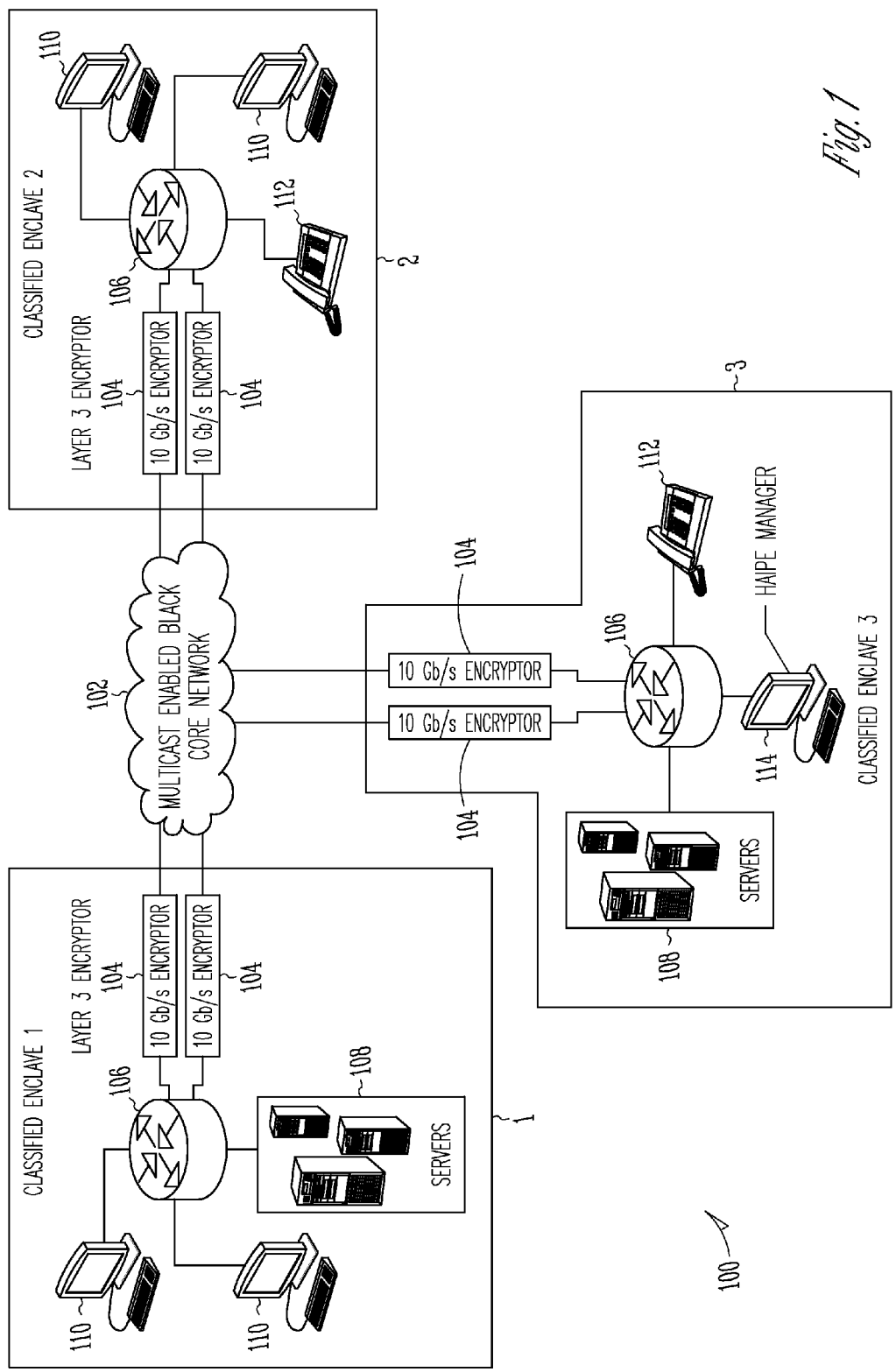
FIG. 1 illustrates a computer network.

A computer network 100 is shown in FIG. 1. In the embodiment shown, traffic inside each enclave is plaintext, while traffic between data enclaves is ciphertext. In the example network shown in FIG. 1, ciphertext network 102 transfers encrypted traffic between each of data enclaves 1-3 via encryptors 104. In one example embodiment, ciphertext network 102 is a multicast-enabled black core network encrypted using Type 1 encryption. Type 1 encryption is encryption classified or certified by the National Security Agency (NSA). It must be developed using established NSA business practice and must contain NSA approved algorithms. Other types of encryption can be used as well, including IPsec encryption (but, in some embodiments, without multicast).

Each data enclave (or red network) includes one or more computing devices connected through a router 106 to one or more encryptors 104. In some embodiments, information assurance and data integrity are achieved through the use of data encryptors, such as the NSA-approved Type 1 High Assurance Internet Protocol Encryptors (HAIPE). Black core networks can be achieved as well using commercially available network routers or switches, commercial encryption devices and high assurance guards (for cross classification communications).

In the example embodiment shown in FIG. 1, the computing devices include devices such as servers 108, workstations 110, IP telephones 112 and HAIPE managers 114.

Early HAIPE specifications focused on encryption techniques and basic HAIPE management. This level of capability allowed for point-to-point bulk encryption between Red enclaves. More recent HAIPE specifications have added peer HAIPE discovery and support for point-to-multipoint communications, but they still lacked the failover and network routing features required to effectively learn the Red network topology. To meet the full requirements of the Black Core network, in one embodiment, network 102 is enhanced to include 1) triggered Red network topology updates (based on link failures and route metric changes); and 2) National Security Agency (NSA) approved Black Network to Red Network signaling techniques, as described below. These enhancements, coupled with custom developed event driven software running in the network switches and computing devices, have enabled the first instantiation of a self-healing Red Network via interaction with the Black Core.

Recent versions of HAIPE specification (e.g., Version 3.0.2) added support for peer HAIPE discovery. The performance of the embedded failover mechanisms did not, however, scale well to large networks. In the following sections, the problem of scaling and HAIPE control plane overload will be discussed and alternative mechanisms that scale well in terms of network size and enhanced performance will be revealed.

HAIPE Version 3.1 introduced a feature known as Peer HAIPE Reachability Detection Protocol (PHRD). PHRD enables peer HAIPE devices to maintain a list of active peers and to determine when a peer is no longer reachable. PHRD specifications include two tunable parameters:

PHRD Rate: This field allows the user to specify the rate (in seconds) that PHRD messages should be transmitted.

PHRD Retry Count: This field contains the number of successive missed requests that will cause the device to determine that the endpoint is unreachable.

In the network 100 shown in FIG. 1, redundant HAIPE devices 104 are installed within each data enclave in order to provide alternate paths into each enclave. In theory, PHRD can be used to alter the traffic flow through HAIPEs 104 upon the detection of a new peer or the loss of a peer. To achieve fast failover, the PHRD Rate and PHRD Retry Count can be set as low as (1, 1). This translates to one second heartbeats and the declaration of the loss of a peer after the first missed heartbeat. Since this protocol is based on the User Datagram Protocol (UDP) which has no message delivery guarantee, a PHRD setting of (1,1) is not considered to be a safe setting as there are many reasons in a network that a single message can be missed. Therefore, the minimum reasonable PHRD values are (1, 2 and 1, 3). These values don't guarantee fast failover two-way traffic; the results for outgoing traffic could be longer.

In some embodiments, only one HAIPE encryptor 104 is used for an enclave when, for instance, the added availability is not needed, or not worth the cost of the extra encryptor 104.

In one embodiment, PHRD message processing requires special handling which could result in longer failover times if a large number of PHRD messages need to be handled. In a network with 100 HAIPEs, rapid PHRD signaling could result in over 400 messages/second for each HAIPE in the network. This type of message processing is only a portion of the normal control plane message processing. Other messages include Internet Group Membership Protocol (IGMP), Routing Information Protocol (RIP) and Peer Destination Unreachable (PDUN). Because of this overhead, PHRD does not scale well beyond a network with a handful of HAIPEs.

CT-to-PT Disable

In a standard network topology, a failure of a link between two switches/routers is determined in one of two ways: 1) loss of the physical link; and 2) loss of communications protocol between adjacent neighbors. Routers in such networks detect failure of the link, and route around the failed link.

When, however, an encryption unit like the HAIPE 104 is inserted between two routers 106, the result is two isolated networks where the CT (Black) side is prohibited from communicating directly with the PT (Red) side. This level of isolation is exactly what one wants for enclave isolation, but it causes significant issues when trying to maintain network services and react to network/link failures. It becomes difficult to detect a link failure and to propagate that information so that the network routers can route around the failed link. To mitigate this issue, in some embodiments, encryptor 104 includes a feature termed "CT-to-PT Disable".

Figure 2:
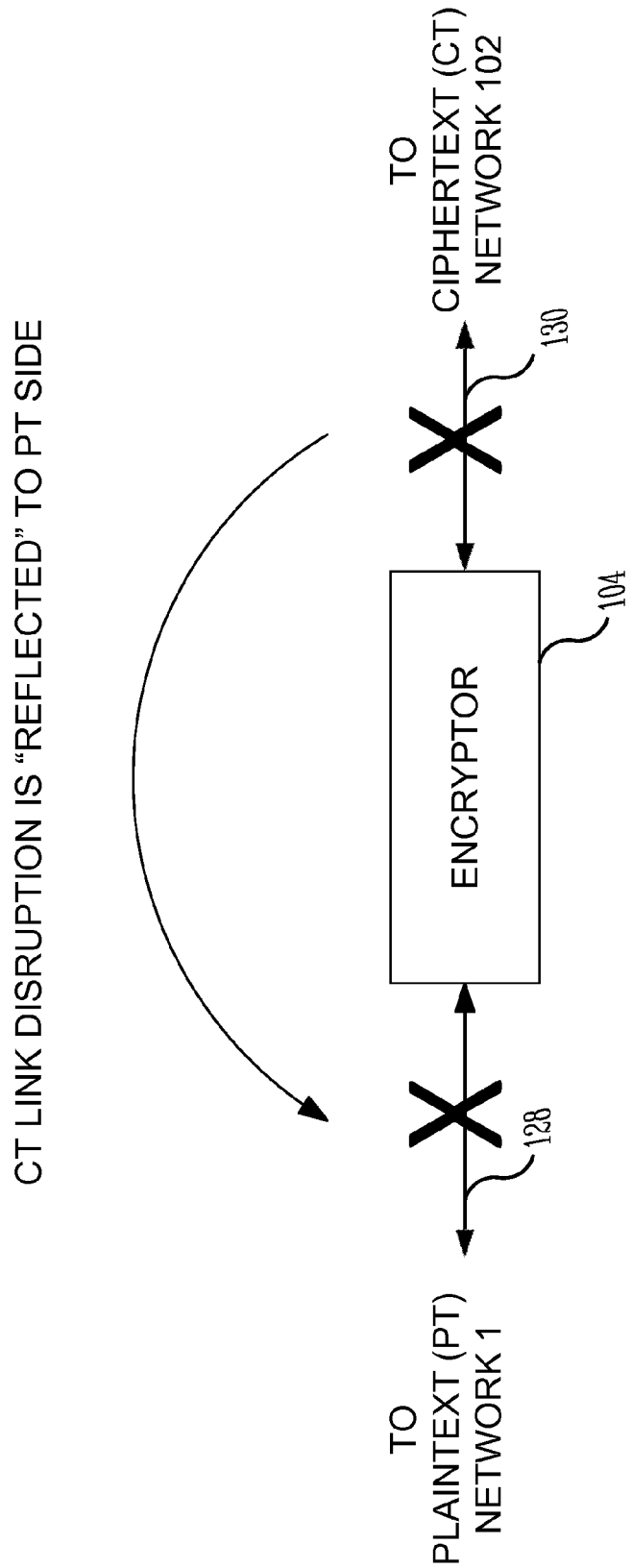
FIG. 2 illustrates CT-to-PT Disable.

With the CT-to-PT Disable feature enabled, encryptor 104, upon loss of its CT link 130, will automatically disable PT link 128, thus reflecting the CT (Black) network 102 failure to the PT (Red) network 1. An example of this is shown in FIG. 2. Disabling the PT link in turn allows the routers 106 in Red network 1 to take action and reroute the traffic along another path. The CT-to-PT Disable feature has been successfully tested and it provides a critical trigger mechanism for Red network failover capability.

Figure 3:
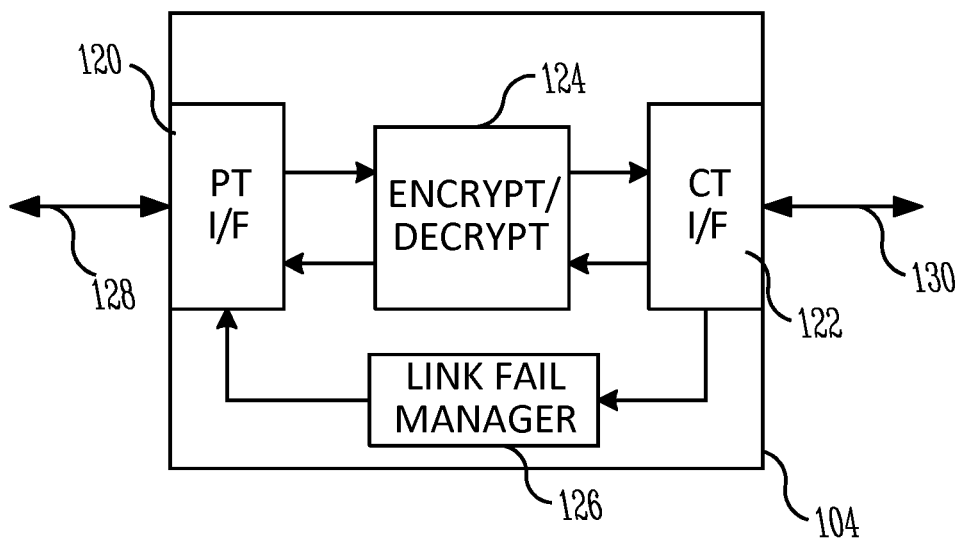
FIG. 3 illustrates an encryptor with a link failure manager that can be used in the network of FIG. 1.

A more detailed example embodiment of encryptor device 104 is shown in FIG. 3. In device 104 of FIG. 3, each encryptor device includes a plaintext interface 120 that can be connected to the router 106, a ciphertext interface 122 that can be connected to the unclassified network 102, an encryption module 124 and a link failure handler 126. The link failure handler 126 detects failure of a link in the unclassified network and reflects the failure of the ciphertext link 122 through the plaintext interface 120 to its corresponding red network. Encryption module 124 receives plaintext from the plaintext interface 120, encrypts the plaintext to form ciphertext and transmits the ciphertext out through the ciphertext interface 122 to the unclassified network. Encryption module 124 also receives ciphertext from the ciphertext interface 122, decrypts the ciphertext to form plaintext and transmits the plaintext out through the plaintext interface 120 to its corresponding red network.

In one example embodiment, plaintext interface 120 is connected to a plaintext link 128 while ciphertext link 122 is connected to a ciphertext link 130. The link failure handler 126 reflects the failure of ciphertext link 130 by disabling the plaintext link 128.

Figure 4:
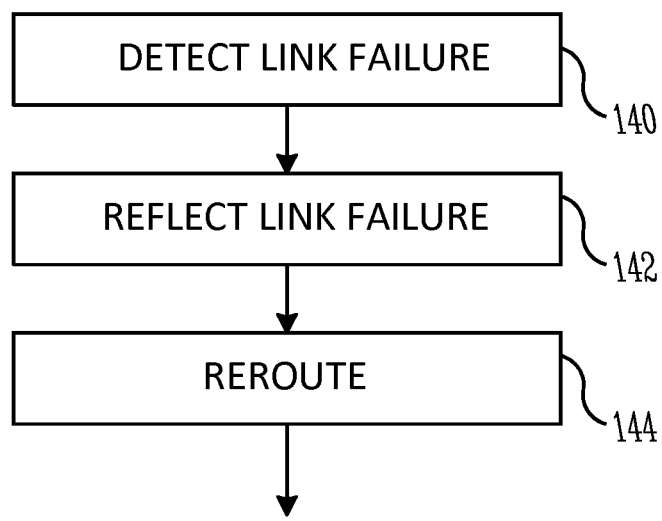
FIG. 4 illustrates a CT-to-PT disable method.

In operation, as is shown in FIG. 4, a method of reflecting a link failure within a black network 102 to a red network includes providing an encryptor device 104, detecting, at 140, a link failure at the ciphertext interface 122 and reflecting, at 142, the ciphertext failure at the plaintext interface 120. The encryptor device 104 includes a plaintext interface 120 connected to the red network, a ciphertext interface 122 connected to the black network, and an encryption module 124. The encryption module 124 encrypts data transferred from the plaintext interface 120 to the black network 102 through the ciphertext interface 122 and decrypts data transferred from the ciphertext interface 122 to the red network through the plaintext interface 120. The reflected ciphertext failure is detected by a router 106 or a computing device (such as server 108 or workstation 110) with the plaintext network and, if an alternate route is available, messages directed to destinations across the ciphertext network are rerouted, at 144, through the alternate route.

Figure 5A:
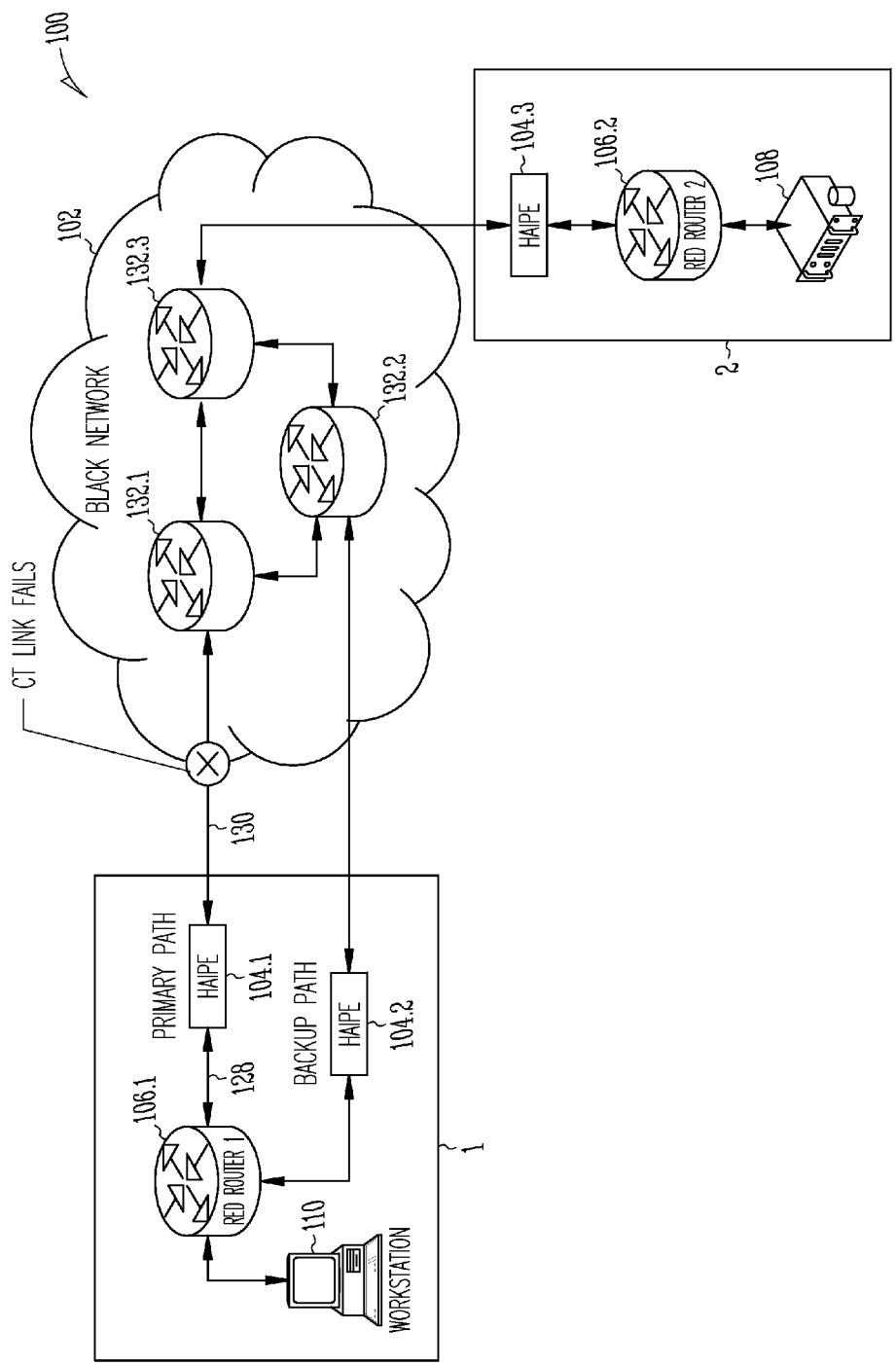
FIGS. 5a-5c illustrate an example of one approach for CT-to-PT Disable.
Figure 5B:
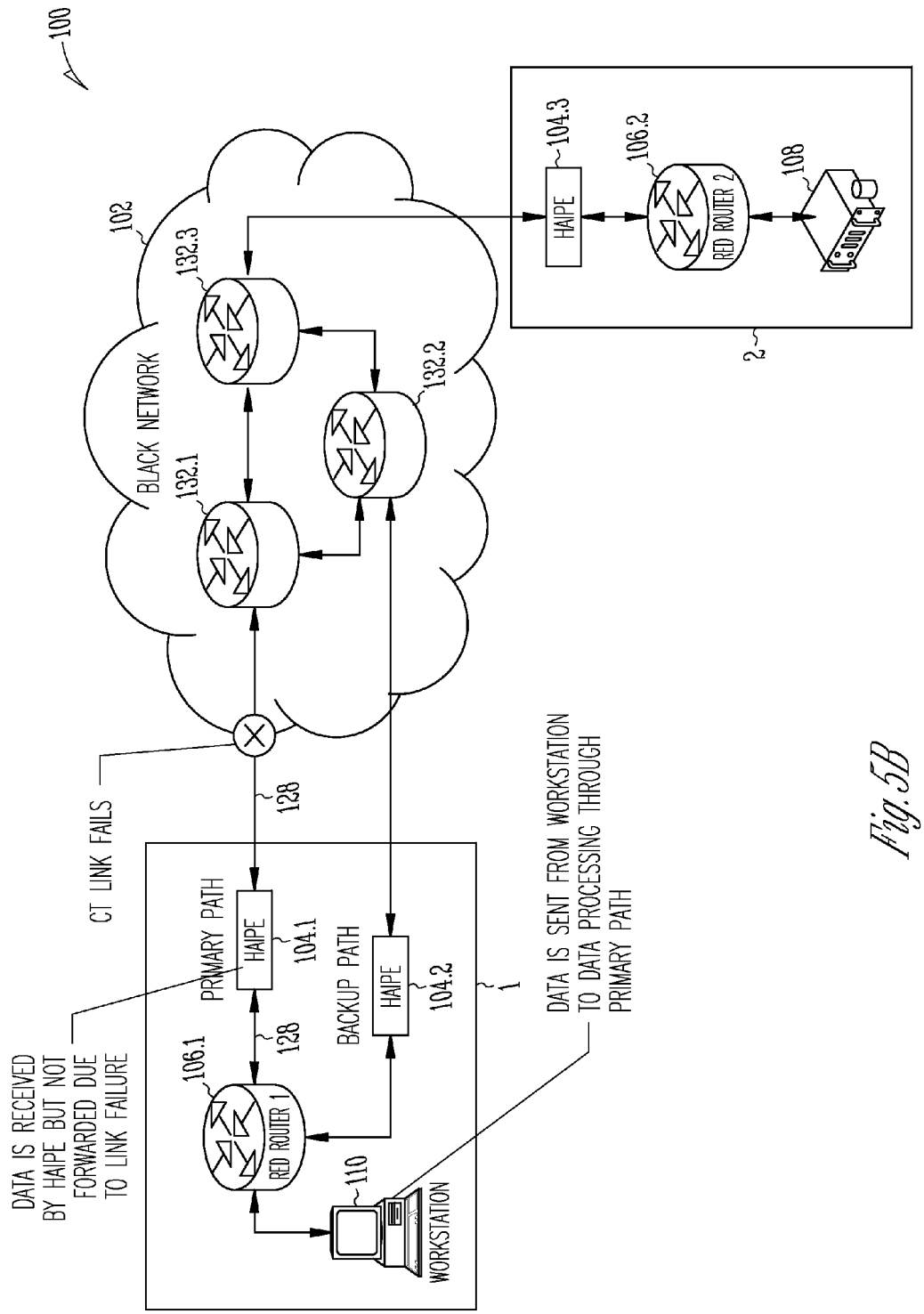
Figure 5C:
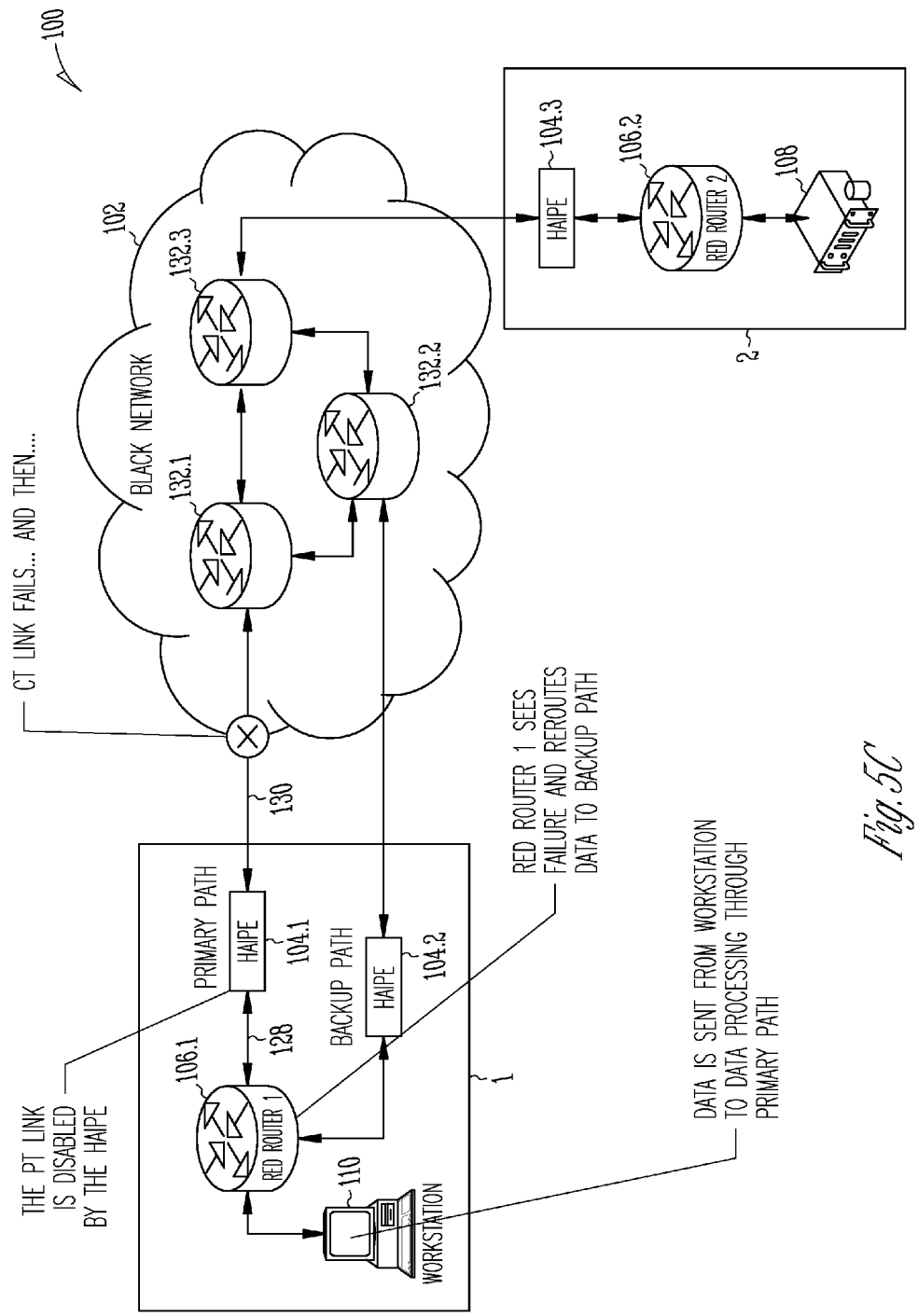

An example of CT-to-PT Disable is shown in FIGS. 5a-c. In the example embodiment shown in FIG. 5a, the CT Link 130 connecting HAIPE 104.1 to an edge router 132.1 in black core network 102 has failed, blocking communication on the primary path between server 108 and workstation 110. Red router 106.1 is, however, unaware that CT link 130 is no longer working. As shown in FIG. 5b, data sent to server 108 from workstation 110 is routed on the primary routing path until it reaches HAIPE 104.1 and cannot be forwarded due to the failure of CT link 130. As noted above, in prior systems, system 100 had no efficient way of resolving this type of failure.

In the example embodiment shown in FIG. 5c, when HAIPE 104.1 detects the failure of ciphertext link 130, it disables plaintext link 128. Red router 106.1 sees the failure of plaintext interface link 128 and reroutes network traffic to the backup path through HAIPEs 104.2 and 104.3 and edge routers 132.2 and 132.3 to server 108. In some embodiments, a separate return path mechanism is required to establish full two-way traffic.

Dynamic Topology Table Updates

In traditional networks, routing protocols are employed to derive and synchronize the network topology across a group of routers in a network. Routing protocols such as RIP, OSPF, EIGRP or any equivalent protocol are often employed to achieve this level of synchronization.

Figure 6:
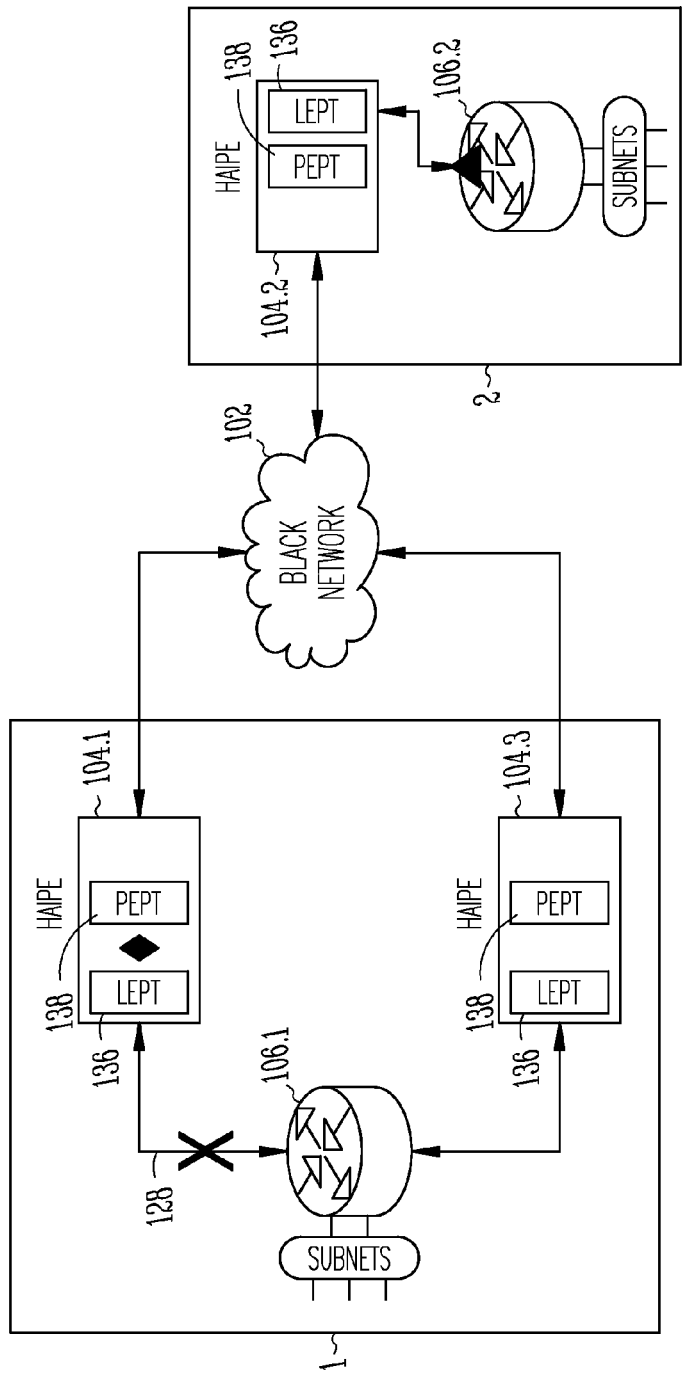
FIG. 6 illustrates dynamic routing topology updates.

Although in most embodiments encryptors 104 themselves are not routers, they do, in some cases, act like pseudo routers. That is, in some embodiments, they provide a list of end PT routes to a local PT router (such as router 106) and they receive and interpret protocol update messages to populate a local plaintext network topology table 136 (such as the Local Enclave Prefix Table (LEPT) in HAIPE encryptors). Plaintext network topology tables include route metrics associated with each route. The route metrics indicate a preferred path. One such embodiment is shown in FIG. 6. In the original implementation of the HAIPE's version 3.1.2 software, routing metrics for subnets protected by the HAIPE were not transmitted to any peer HAIPEs 104. Peer HAIPEs would only receive the "static" administrative route metric provisioned by the user when the HAIPE was first configured. That static administrative information would be stored in a ciphertext network topology table 138 (such as a Peer Enclave Prefix Table (PEPT)). If a link failed or a routing metric changed in the Red network, the change would not, therefore, be transmitted to the peer HAIPEs. In one example HAIPE embodiment, each encryptor 104 includes a way of forwarding learned route metrics to peer HAIPEs when they respond to HAIPE discovery and failover protocol messages (Peer Destination Unreachable Notification (PDUN), PROBE, and "TRYME" messages). In some embodiments, topology tables go beyond route metrics to include the routing information itself.

In one such embodiment, as is shown in FIG. 6, if the PT link 128 on a HAIPE 104 is disconnected or disabled, the plaintext network topology table 136 is automatically cleared by HAIPE 104. Clearing the plaintext network topology table indicates to the HAIPE 104 that it has no routes to the PT side of the network. As a result, if and when a packet is received from another HAIPE destined to the PT routes supported by the subject HAIPE, the subject HAIPE will send a "PDUN" message back to the source HAIPE indicating that the destination is unreachable. The source HAIPE is now responsible to use an alternate route or to send a probe to its peer HAIPEs to discover an alternate path.

Figure 7A:
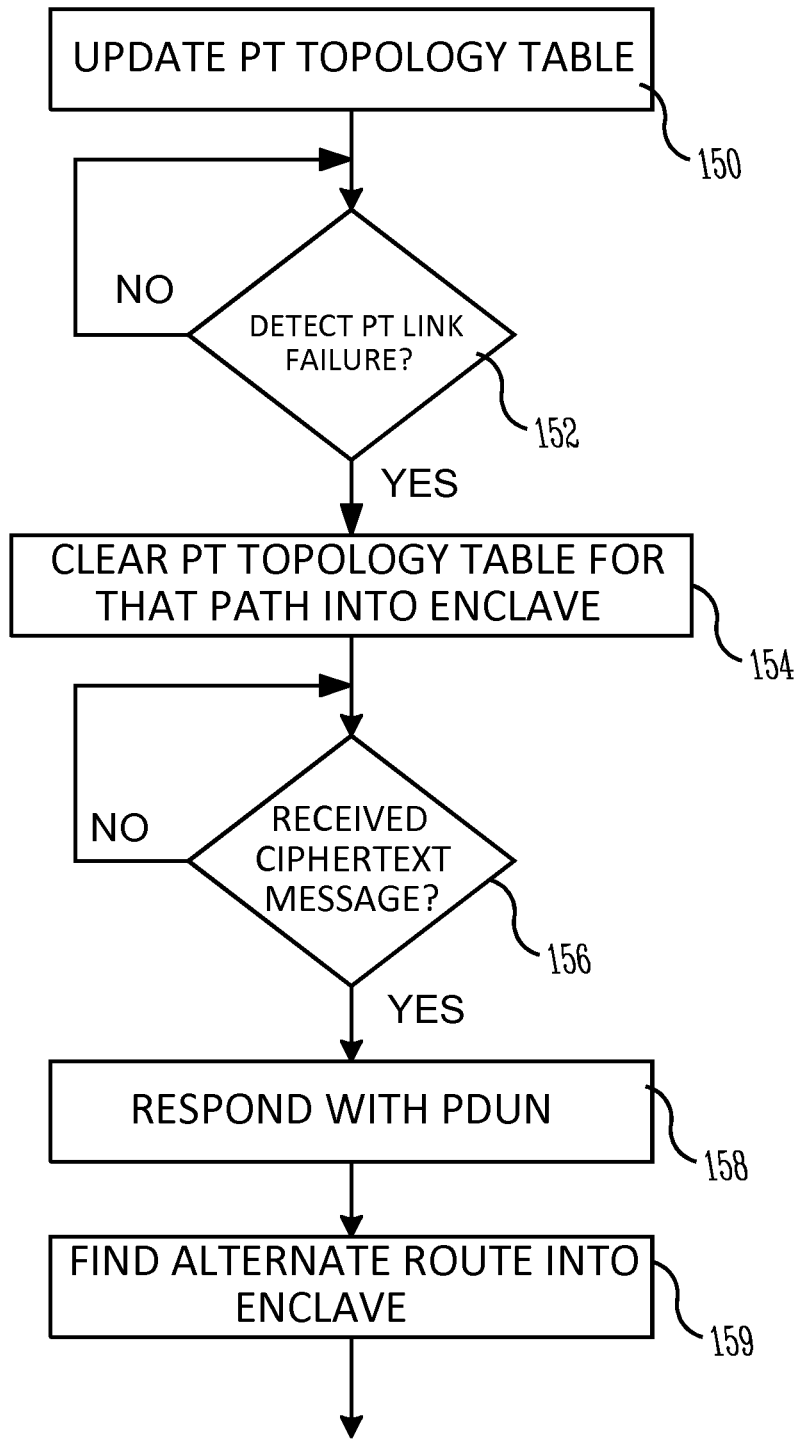
FIGS. 7A and 7B illustrate methods of performing dynamic routing topology table updates.

In one example HAIPE embodiment, such as shown in FIG. 7A, network discovery is completed and the ciphertext network topology table 138 (such as a Peer Enclave Prefix Table (PEPT)) is updated with the results. At 150, plaintext network topology table 136 within each HAIPE 104 is updated by routing protocol update messages from routers 106 within the enclave. Data flows from the source to the destination subnet based on the contents of plaintext network topology table 136 in the destination HAIPE 104. In the embodiment shown in FIG. 7A, at 152, encryptor 104 detects that plaintext link 128 has failed or is disabled. At 154, encryptor 104 modifies the plaintext network topology table 136 to indicate that there are no paths from the encryptor to the plaintext network. In one such embodiment, this is done by clearing out each entry in plaintext network topology table 136. In another embodiment, a flag is set that overrides the entries in plaintext network topology table 136. At 156, encryptor 104 checks for new ciphertext messages and, if it detects one, it responds with a PDUN to the source encryptor 104 at 158. Source encryptor 104 then, at 159, attempts to send out the message via an alternate route.

In another example embodiment, router 106 notifies encryptor 104 if a path in plaintext network topology table 136 is no longer available, or if the route metrics for that route have changed. One such example embodiment is shown in FIG. 7B.

Figure 7B:
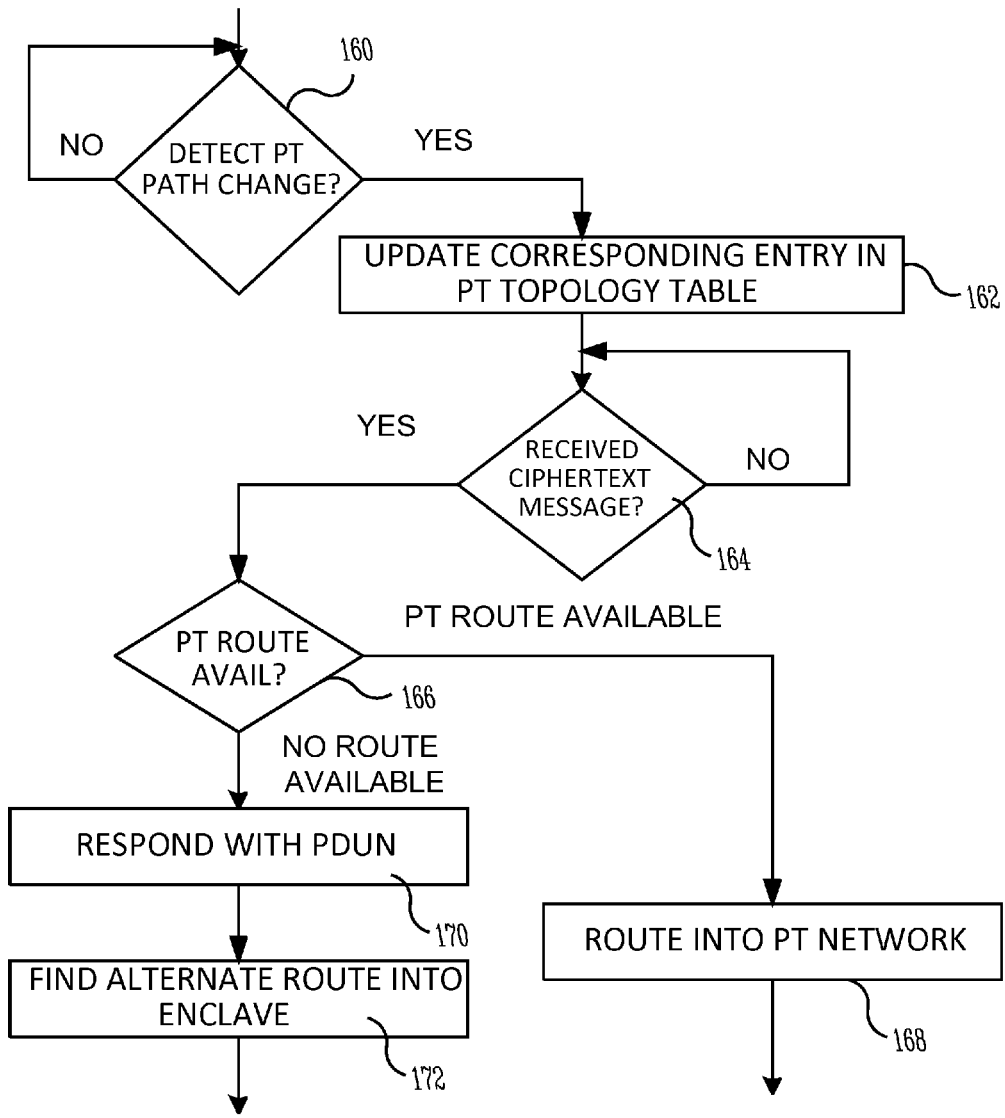

In the example embodiment shown in FIG. 7B, if a primary path to a router 106 within the plaintext network is disrupted, the affected router 106 sends a triggered message at 160 to the HAIPE 104 indicating that the route metrics for the path through that router 106 have changed. The path may no longer be usable, or the cost of that path may have increased. The route metrics are stored in an entry associated with that route within plaintext network topology table 136. For instance, if the data path is no longer available, plaintext network topology table 136 is updated at 162 to show that the data path is not available. Subsequent transfers to HAIPE 104.1 across network 102 are checked at 164 and a determination is made at 166 whether a PT route from that encryptor 104 is available. If a route is available, the data packet is forwarded at 168 along that route. If, however, the check at 166 finds no route to the destination is available from that encryptor 104, encryptor 104 responds at 170 with a PDUN in response to the data packet. Source encryptor 104.2 receives the PDUN and attempts to route the packet via an alternate route at 172. In the embodiment shown in FIG. 6, such a route may be available through encryptor 104.3.

In one embodiment, each encryptor 104 includes a route metrics threshold. In some such embodiments, if the route metric stored in plaintext network topology table 136 is at or above that threshold, the route is treated as unavailable. In one such embodiment, the threshold is set at 16.

In one embodiment, each HAIPE 104 sends a probe via multicast to the other HAIPEs in response to PDUN to determine available data paths. If an alternate path is available, a HAIPE on the backup path sends a multicast TRYME message, with metrics, to the Multicast Address. The Source HAIPE receives the TRYME message via the multicast message, updates its ciphertext network topology table 138 with the new route metrics, and then sends subsequent data to the path with the lowest route metric.

In the discussion above, a RIP protocol is used to perform red-triggered updates. Other approaches could be used as well. For instance, OSPF, EIGRP or any other protocol could be used. It doesn't really matter. The idea is that when a topology change occurs, an update to the encryption unit 104 is initiated assuming it can support that protocol, with the information immediately, so that it can react in real time to changes in network 100.

As noted above, a triggered RIP update occurs when a failed link is detected. In some embodiments, if there is no active traffic, a probe is sent out periodically asking if there are any updates. In some embodiments, a HAIPE responds to the unit that sent the probe. If there are updates HAIPE 104 sends them to everybody. On the other hand, if HAIPE 104 receives a packet, it would reply immediately with an indication that that link is down. The other HAIPE could then use another route.

So, in those embodiments, periodic probes occur and the advertisements occur either automatically as a result of receiving information or on a periodic basis. Triggered updates enhance recovery from failures in HAIPEs 104 by allowing routes to be shared quickly.

Figure 8:
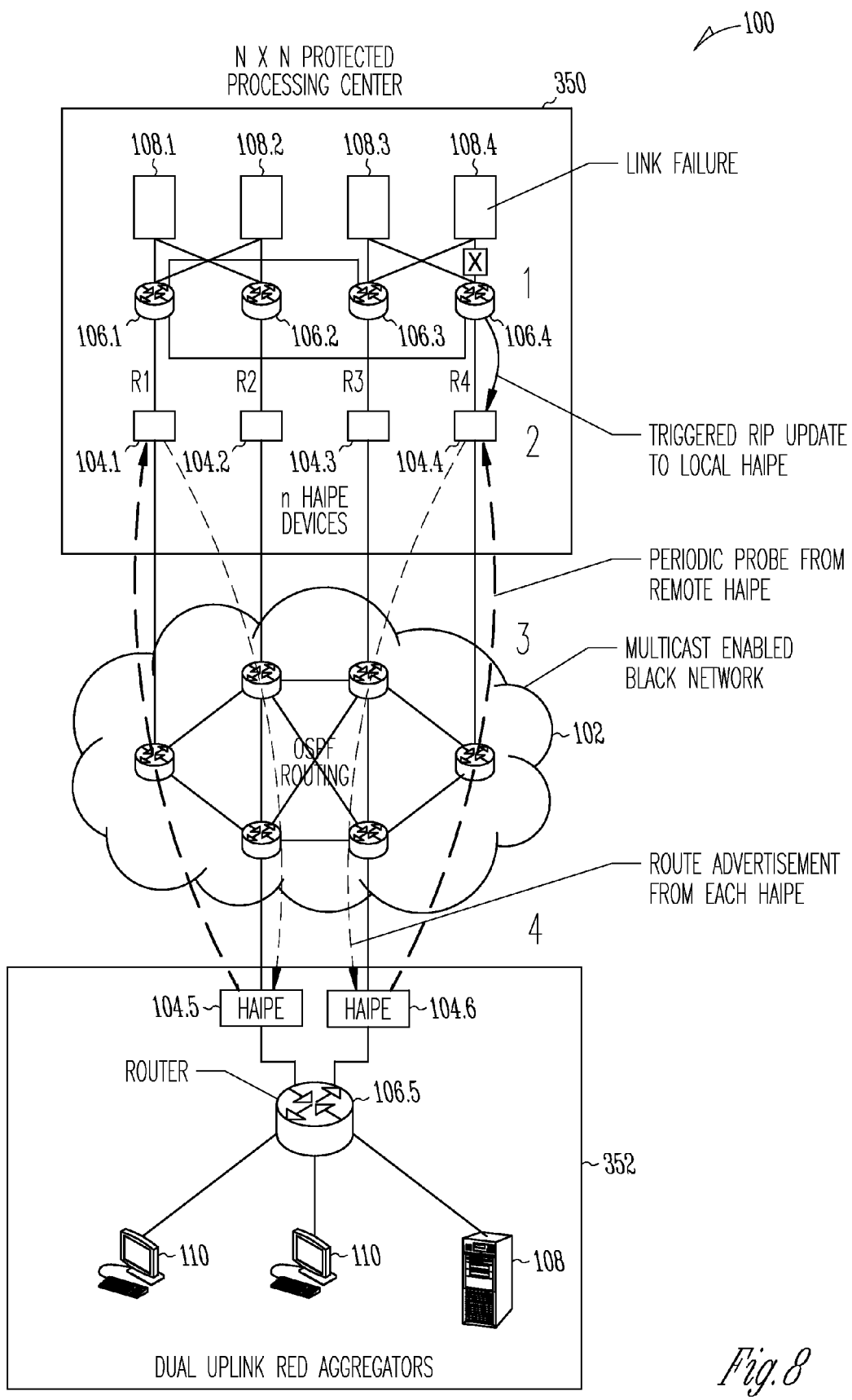
FIG. 8 illustrates another example embodiment of triggered red network topology updates.

Another example embodiment of triggered red network topology updates is shown in FIG. 8. In the example embodiment shown in FIG. 8, processing center 350 is one enclave while enclave 352 is the second enclave. In the example shown in FIG. 8, server 108.4 can be reached via routers 106.3 and 106.4. As shown, the link from router 106.4 to server 108.4 fails. When router 106.4 realizes the link has failed, router 106.4 sends a Triggered topology update to HAIPE 104.4. Periodically, HAIPEs 104 on the other side of network 102 send probes to HAIPE 104.4 to obtain route information from the HAIPEs 104 in processing center 350. Peer HAIPEs in processing center 350 respond to the probes with updated routes and probing HAIPEs update their route tables accordingly.

ICMP Destination Unreachable (ICMP-DU)

One of the challenges to achieving rapid failover in a network 100 with a large number of encryption devices 104 is the ability to make a decision in a timely manner based on dynamic network topology changes. For example, in a HAIPE embodiment, using the HAIPE's inherent PHRD mechanism noted above requires the sequential loss of three heartbeats. If the HAIPEs were capable of maintaining a signaling a rate of one second heartbeats, it would take a minimum of three seconds for a remote HAIPE to declare "loss of communications" and to initiate routing network traffic along another viable path.

To mitigate the PHRD performance issues, in one embodiment an Internet Control Message Protocol-Destination Unreachable (ICMP-DU) feature is added to each encryptor 104. The ICMP-DU feature allows encryptors 104 (such as HAIPEs) to detect loss of communication to peer encryptors 104 (e.g., other HAIPEs) as soon as they attempt to send a message to a peer encryptor 104 after a Cipher Text (CT) link failure on that encryptor 104. Because black core network 102 is aware of link state changes, the disruption of a single or multiple CT link 130 to edge router 132 results in a network wide topology change.

Figure 9:
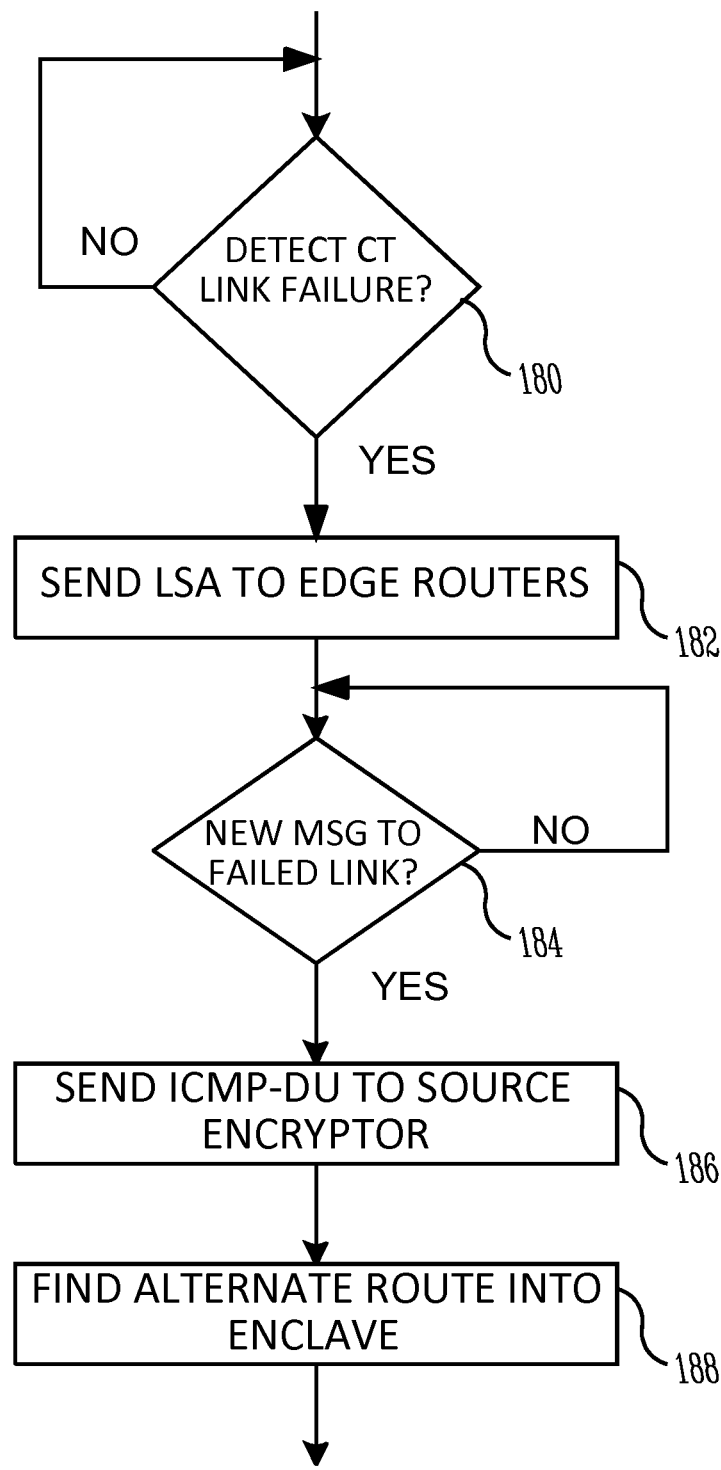
FIG. 9 illustrates one embodiment of Internet Control Message Protocol-Destination Unreachable (ICMP-DU)
Figure 10A:
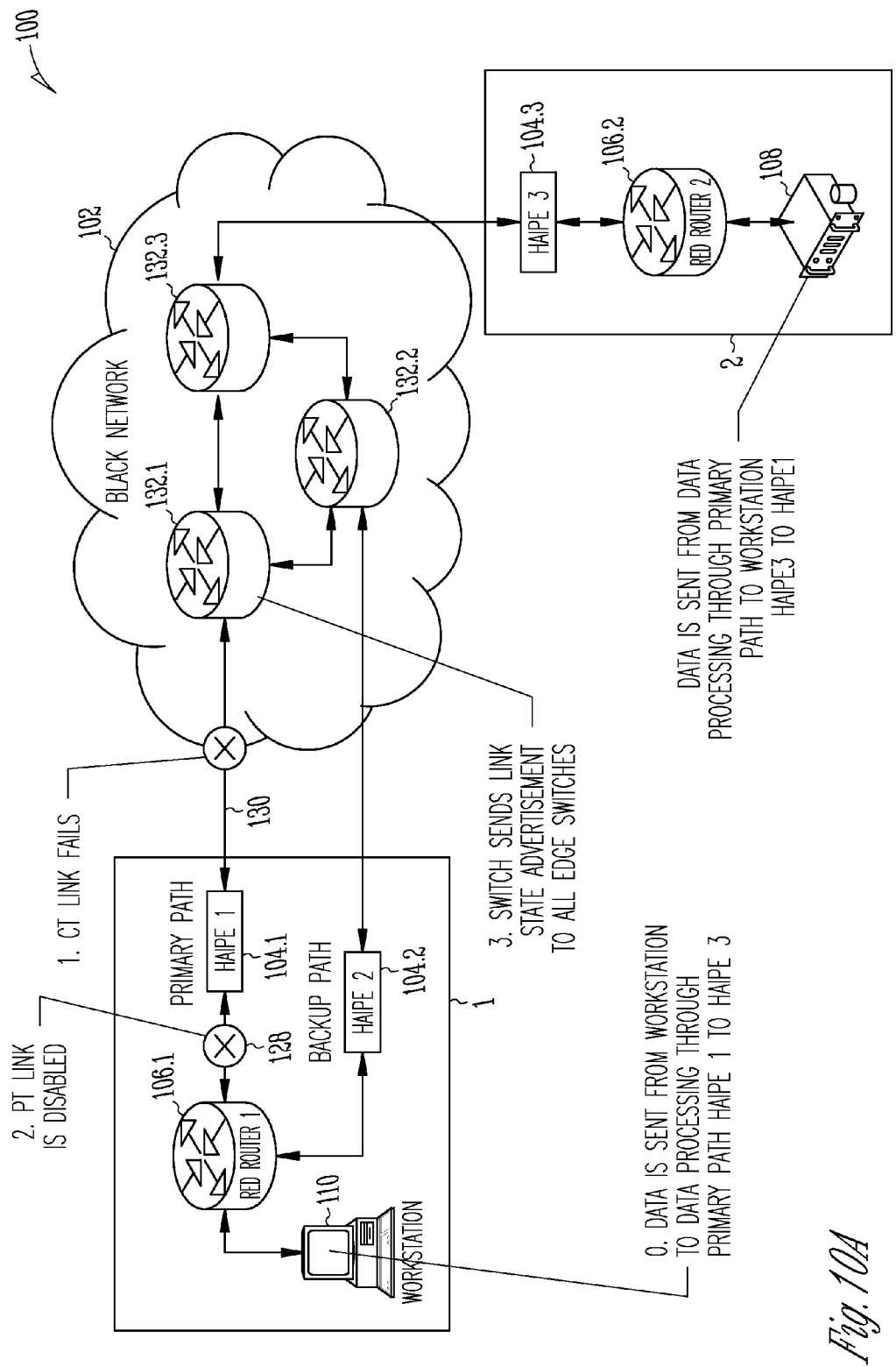
FIGS. 10a and 10b illustrate operation of an example embodiment an Internet Control Message Protocol-Destination Unreachable (ICMP-DU)
Figure 10B:
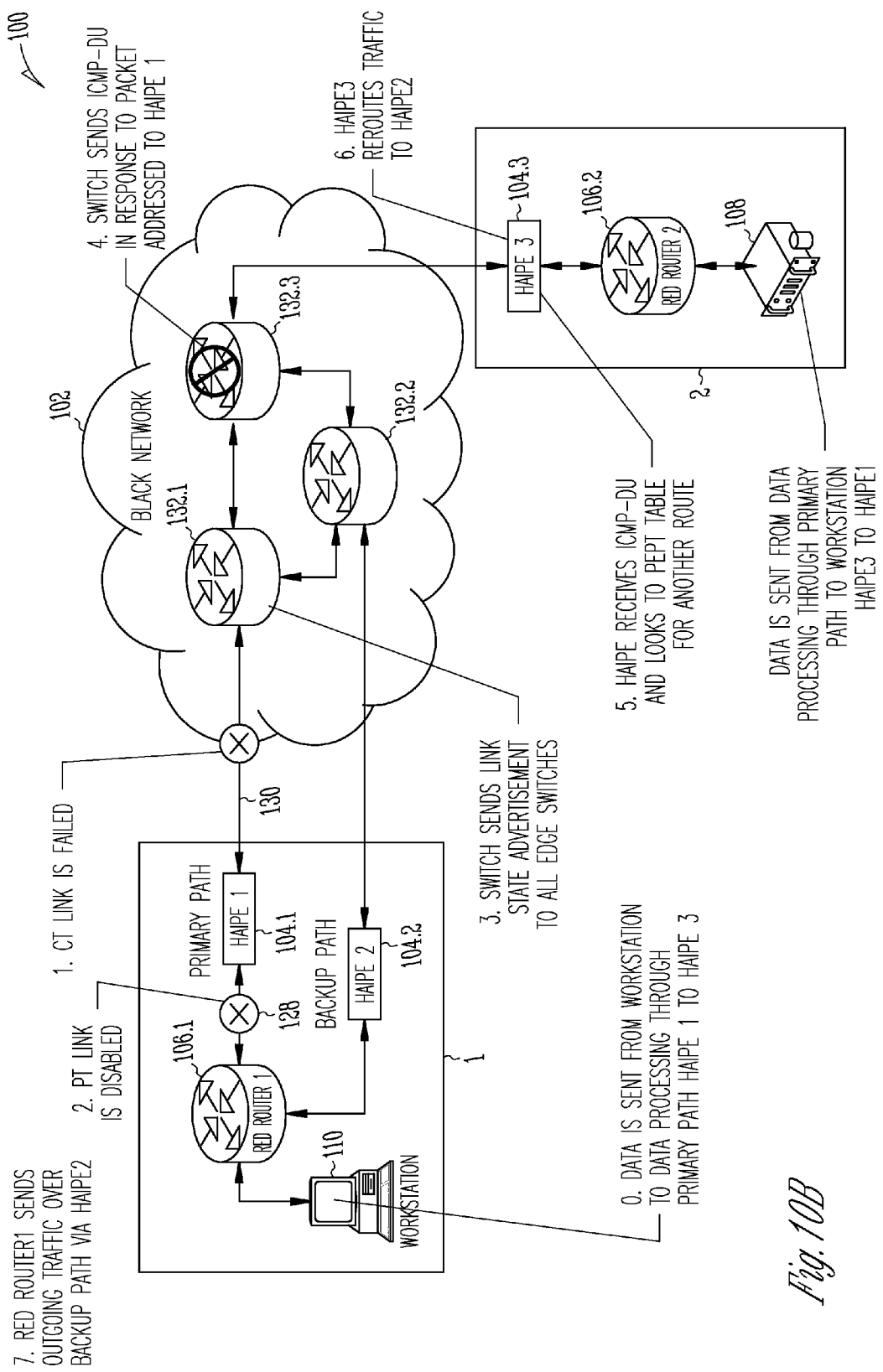

As shown in FIGS. 9, 10a and 10b, a CT link 130 fails. At 180, the edge router 132 adjacent the failed CT link 130 detects the failure and, at 182, sends a Link State Advertisement to all other edge routers 132 in network 102. Each edge router 132 that receives the Link State Advertisement notes the broken CT link and monitors, at 184, for subsequent packets addressed to the encryptor 104 associated with that failed CT link 130. If packets addressed to the encryptor 104 associated with that failed CT link 130 are subsequently received at an edge router 132, that edge router responds, at 186, with an Internet Control Message Protocol-Destination Unreachable (ICMP-DU) to its adjacent encryptor 104. In one embodiment, the packets are then discarded.

When an encryptor 104 receives an ICMP-DU in response to a packet, it knows that the CT link associated with that path has failed. It will then try a different route, if available, at 188. In one embodiment, upon receiving ICMP-DU, source HAIPE 104 will route to an alternate HAIPE 104, if an alternate route exists and is reachable in its ciphertext network topology table 138, or will probe to discover an alternate route.

Another example embodiment of the Internet Control Message Protocol-Destination Unreachable (ICMP-DU) feature is shown in FIGS. 10a and 10b. In the example shown in FIGS. 10a and 10b, encryptors 104 are HAIPE 3.1 devices capable of building Peer Enclave Prefix Tables (PEPTs) via Peer Discovery. In some such embodiments, the HAIPEs use a multicast mechanism to perform Peer Discovery.

In the example embodiment shown in FIGS. 10a and 10b, a CT link 130 fails and the adjacent edge router 132.1 detects the failure. Edge router 132.1, on detecting a CT link failure, sends a Link State Advertisement to all other edge routers 132 in network 102. Each edge router 132 that receives the Link State Advertisement notes the broken CT link and monitors for packets addressed to encryptor 104.1 (the encryptor 104 associated with that failed CT link 130). If packets addressed to encryptor 104.1 are subsequently received at, for example, edge router 132.3, that edge router responds with an Internet Control Message Protocol-Destination Unreachable (ICMP-DU) to its adjacent encryptor 104.3. In one embodiment, the packets are then discarded.

When encryptor 104.3 receives an ICMP-DU in response to a packet, it knows that the CT link associated with that path has failed. It will then try a different route, if available. In one embodiment, encryptor 104 receives the ICMP-DU and looks in its PEPT table for another route.

In embodiments in which the encryptors 104 include the CT-to-PT Disable feature, HAIPE 104.1 disables its PT link 128 when it detects the failure of CT link 130. Red router 106 in enclave 1 then starts the process of failing over to the backup path (via HAIPE 104.2).

In one example embodiment, each router 132 that terminates an HAIPE 104 is made aware of the failure of a CT link 130 through the Link State Advertisement. Therefore, as soon as a HAIPE 104 attempts to send a message to a peer that has been disrupted, the edge router 132 will send an ICMP-DU message to the source HAIPE 104 via its adjacent edge router. The significant advantage of this approach is that the HAIPEs learn that they cannot communicate with a peer HAIPE directly from the black network itself rather than relying on missed heartbeats from the Red Network (PHRD). HAIPE 104 can, therefore, react almost immediately to a CT link failure, transferring the packet across an alternate route if available. In addition, this approach scales extremely well as each router 132 in network 102 is informed of network/link outages via the routing protocol Open Shortest Path First (OSPF) or other routing protocol.

It should be apparent that the CT-to-PT disable feature lets red network routers know of a failure in a CT link on outgoing messages, while the ICMP-DU mechanism is used to let HAIPE devices on the other side of the black network know of failures in CT links that are being routed into an enclave. The combination of CT-to-PT disable with PHRD gives one a mechanism for reporting link failure throughout network 100, but it can take seconds to disseminate the information. The combination of CT-to-PT disable and ICMP-DU provides a mechanism for quickly reporting link failure throughout network 100.

At the same time, ICMP-DU could be used without CT-to-PT Disable to report failures in packet transfer due to CT link failure. Application software operating in conjunction with the ICMP-DU mechanism could then be used to track down and report CT link failure within the red networks. In one embodiment, network 100 uses a red-side network ping tool on the red network to confirm CT link up or CT link failure. In another embodiment, HAIPE 104 is configured for RIP send and CT link failure is confirmed when there are no learned routes in plaintext topology table 138.

As can be seen in the examples above, it can be advantageous to have multiple paths into an enclave. If there are at least two paths into and out of an enclave, network 100 can employ the self-healing mechanisms described above to route around the failed path.

It can also be advantageous to make network 102 self-healing without intercession by computing devices within any of enclaves 1-3. In some embodiments, this is accomplished by providing redundant paths through network 102. In some such embodiments, network 102 is a mesh network.

The failure detection and reporting mechanism above can be used in a number of topologies, as detailed next. In each of the example topologies, black core network 102 is constructed as a partial mesh and, as such, is inherently self-healing due to the multiple redundant paths between routers.

The Dual-Uplink Red Aggregation Topology shown in FIG. 8 is primarily used to protect classified equipment in an enclave or work center. Equipment such as workstations, Displays and peripherals connect directly to the Aggregation Switch as depicted in FIG. 8. In this network topology, failover is governed by the Aggregation Switch (router 106.5) which is responsible for selecting between two uplinks to HAIPES 104.5 and 104.6. Because the HAIPEs are inserted between the Aggregation Switch and Black Core Network 103, this topology cannot participate in black core routing protocols.

It should be noted that with a dual uplink topology, router 106.5 can be configured to allow both links to be simultaneously active and "load share" to ciphertext network 102. However, for this to be successful under all conditions, the total aggregate uplink bandwidth should be engineered for no more than 70-80% of the full bandwidth of a single link. The 20-30% reserve will allow for surge bandwidth which is often experienced during startup scenarios and in failure recovery events. In addition, one should be careful with multicast traffic as it is possible to end up receiving the same multicast streams on both links simultaneously and delivering duplicate packets to applications. Configuring dual uplink router 106.5 for primary/backup operation avoids the duplicate multicast packet issue.

In a Dual Uplink Red Aggregation topology such as shown in FIG. 8, the HAIPEs play an active role in the failover process. The following protocols are used depending on the failure mode. For instance, if one of the uplinks between HAIPE 104.5 and the ciphertext network 102 fails (CT Failure), HAIPE 104.5 is responsible for "reflecting" the failure to the Red Side of the HAIPE by disabling the Plain Text (PT or Red) link connected to the Aggregation Switch 106.5. This CT-to-PT reflection mechanism allows the Aggregation Switch to react to the failure by switching the multicast and unicast outgoing traffic to the backup link. At the same time, ICMP-DU is used to report the CT link failure back to any HAIPE trying to communicate through the failed CT link.

A PT link failure is reported via PDUN, and reported back to the source HAIPE via a PDUN response.

In one example embodiment, router 106.5 moves traffic from the primary path to the secondary link via script and it "joins" all registered multicast groups configured in router 106.5 on behalf of the host applications. In one such embodiment, router 106.5 detects the link failure, fails over to the backup link and sends Routing Information Protocol (RIP) updates to the HAIPE. At the same time, router 106.5 drops subscriptions to multicast groups on the failed link and joins all multicast groups that were subscribed by all hosts connected to router 106.5. All outgoing traffic is then sent out the backup path, and all incoming traffic is received through the backup path.

As mentioned, the Aggregation Switch (router 106.5 in FIG. 8) is responsible for rejoining the multicast streams. This is done to alleviate the necessity for applications resident on host systems connected to the Aggregation Switch from having to re-join the multicast streams they were previously subscribed to before the link failure. If this process was not followed, each and every application would have to be responsible for the detection of the loss of the multicast traffic and for restarting the multicast traffic by issuing an explicit multicast join request after the failover. What this means to the user systems is that if they were receiving multicast traffic, they would see a slight pause before the streams automatically returned. Services such as streaming video, streaming audio, service location protocols and applications that use multicast to share status and data on a periodic basis would be affected by this type of failure.

Figure 11:
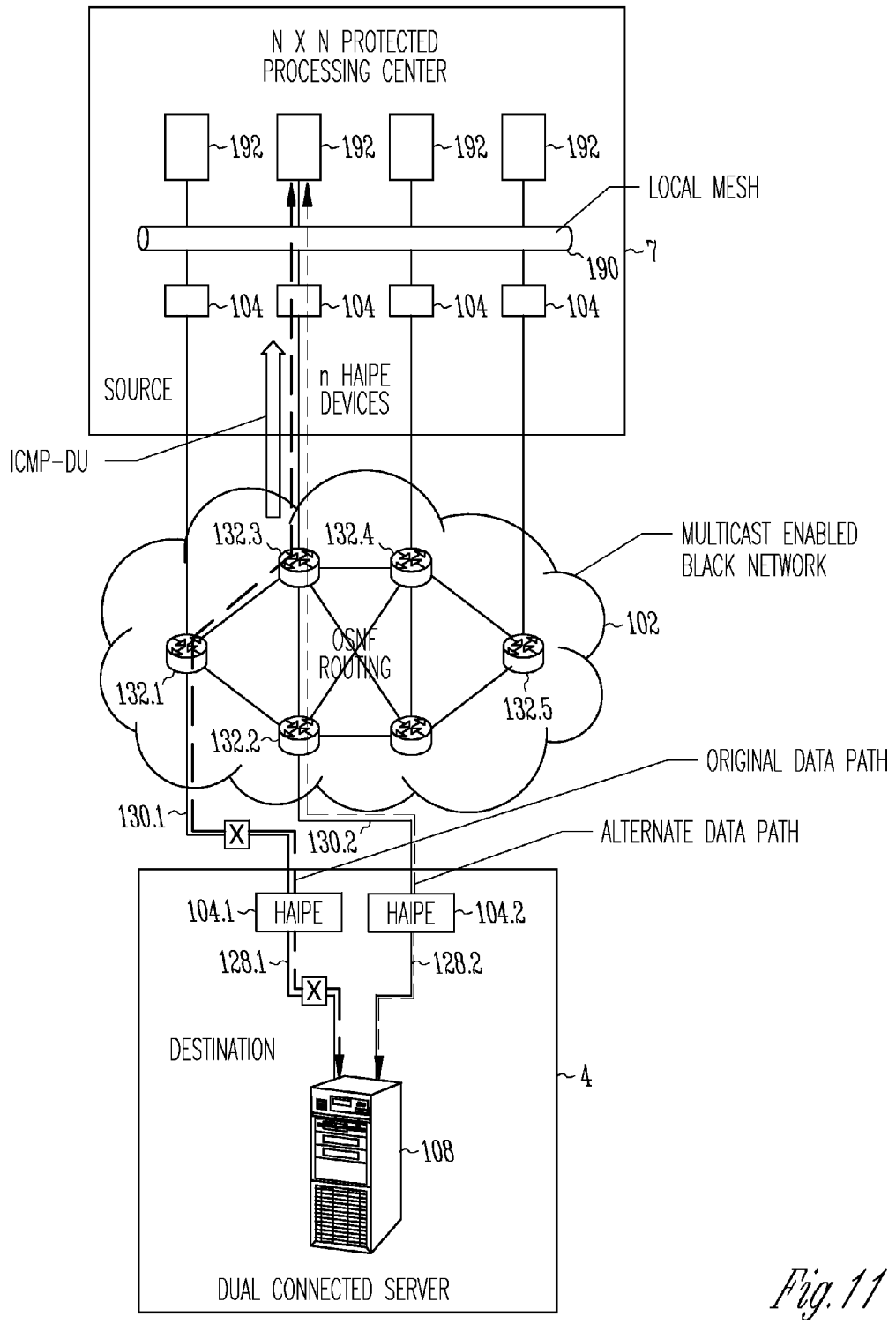
FIG. 11 illustrates a server connected to a CT network via two CT links.

A data enclave 4 having a dual connected server 108 is shown in FIG. 11. In the example shown in FIG. 11, a server 108 is connected to network 102 via a direct connection through encryptors 104 to two CT links 130.1 and 130.2. Server 108 is connected to a first HAIPE 104.1 via a PT link 128.1 connected to a first Ethernet port. Server 108 is connected to a second HAIPE 104.2 via a PT link 128.2 connected to a second Ethernet port.

Server 108 is able to communicate with processing center 7 through four different edge routers 132.1, 132.3, 132.4 and 132.5, providing a lot of redundancy in the data paths between enclaves 4 and 7. In one embodiment, if CT link 130.1 should fail, edge router 132.1 will send a Link State Advertisement (LSA) to all routers 132 in network 102 via, for instance, Open Shortest Path First (OSPF) indicating that CT link 130.1 has failed. Subsequent attempts to write to enclave 4 through CT link 130.1 result in an ICMP-DU message sent to the source HAIPE 104 from the edge router 132 connected to the source HAIPE 104 (in the example shown in FIG. 11, the ICMP-DU message is sent from edge router 132.3). Source HAIPE 104 receives the ICMP-DU message and forwards traffic along an alternate route, if available. At the same time PT link 128.1 is disabled by HAIPE 104.1 as a result of the CT-to-PT Disable. This allows server 108 to switch traffic to its alternate link through 130.2.

It should be noted that processing center 7 includes four different paths to network 102, and an internal mesh network 190 for communication between each of the servers in processing center 7. The result is a highly redundant network as will be detailed below.

Figure 12:
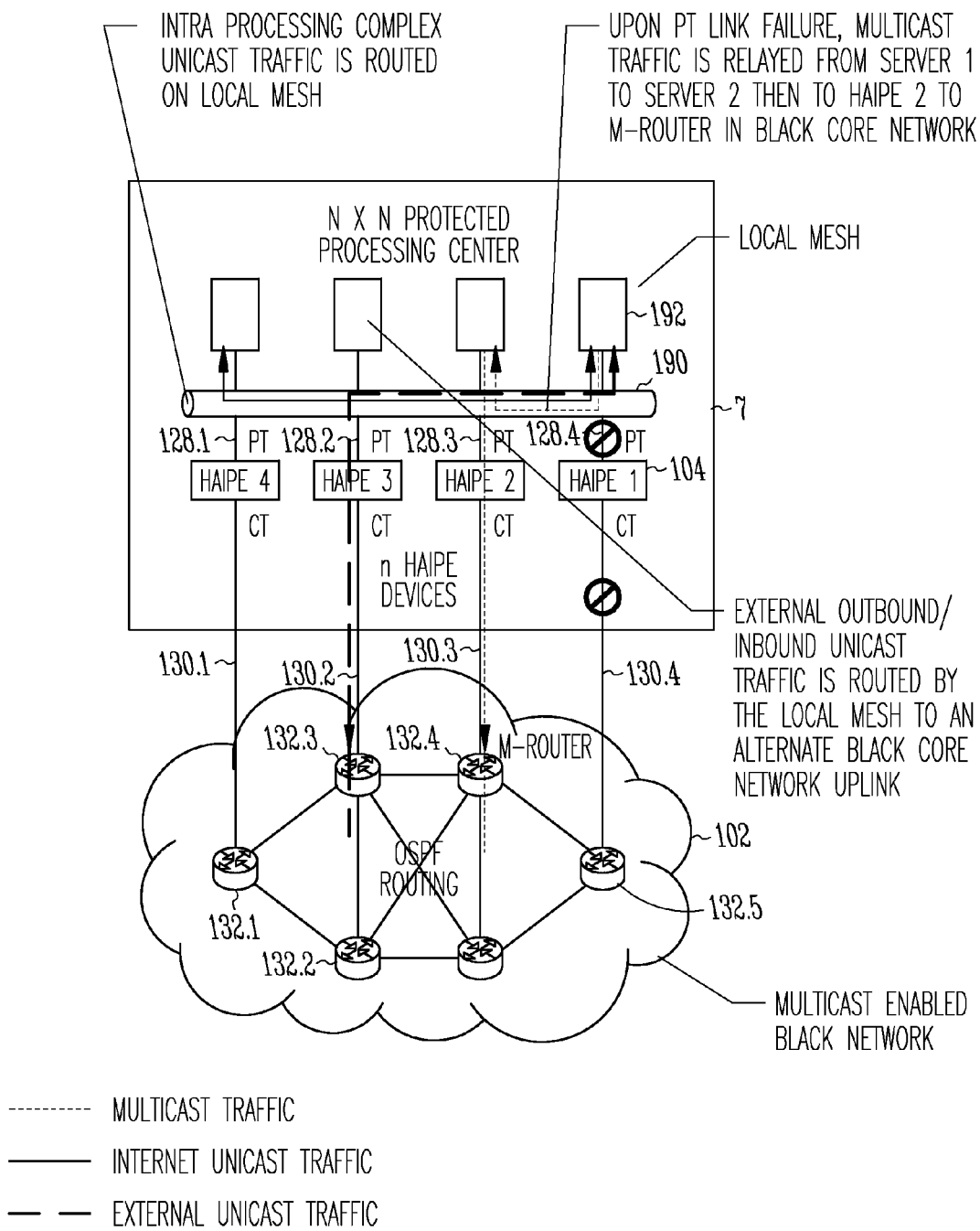
FIG. 12 illustrates one example embodiment of an N×N protected processing center connected to a black core network.

Processing center 7 is shown in FIG. 12. In the example shown in FIG. 12, processing local mesh 190 is used to connect multiple servers 192 together within a single information domain. Mesh 190, in conjunction with the OSPF routing protocol, provides a self-healing capability to cover server complex switch failures as well as fiber ISL failures. In this topology, each server 192 supports a minimum of one connection to the Black Core Network through a HAIPE 104 as illustrated in FIG. 12.

The topology of processing center 7 does not directly participate in any Black Core routing protocols. As such, if a link failure occurs between the HAIPE 104 and the ciphertext network 102 (on CT link 130.4), the HAIPE 104 will reflect the failure to the Red (PT) side (PT link 128.4) of the HAIPE via the CT-to-PT disable feature. The processing server switches will recognize this failure and, based on the routing protocol routing tables, the data will find another path (via another processor chassis) to ciphertext network 102. The term "n×n" protection means that any of the "n" uplinks can be used as an alternate path for any single or multiple failure conditions.

In one embodiment, unicast traffic between processing chassis within the same processing center and information domain will traverse processor mesh 190 and does not have to reach the ciphertext network 102 for transport. However, this is not the case for Multicast traffic. Multicast traffic requires one or more Multicast Router(s) (M-Router) and in this instantiation, the M-Routers are in the Black Core. Hence, all Multicast traffic must hit ciphertext network 102.

Failover for Multicast traffic in the processor chassis is accomplished by using a combination of Multicast relay points within the processing mesh 190 and the Multicast relay capability of the HAIPE 104. When CT link 130.4 fails, the processor switch will relay multicast traffic to the next switch that has an operational uplink. Outbound Multicast traffic will flow over this new link and the switch will issue IGMP join messages for the new groups that are being relayed from the first processor switch. The HAIPE, upon receipt of the IGMP joins will relay the join messages to the Black Core "M-Router" for processing as illustrated in FIG. 12.

In some embodiments, failover times within the Processor Mesh Topology of FIG. 12 can be expected to yield sub second performance as the routing is supported by OSPF. Failover of the PT Uplink whether the result of a PT link failure, a CT link failure or a HAIPE failure yields sub second failover time for all data traffic profiles except for incoming unicast traffic. Incoming unicast traffic requires the far end HAIPE to wait for the "PDUN" message from the local HAIPE to update its route tables.

In some embodiments, network 100 includes 10 gigabit encryptors 104 connected across a mesh black core network 102. In some such embodiments the red and the black networks are 10 gigabit networks. The networks use end-to-end security associations to provide the keys used for encryption.

Figure 13:
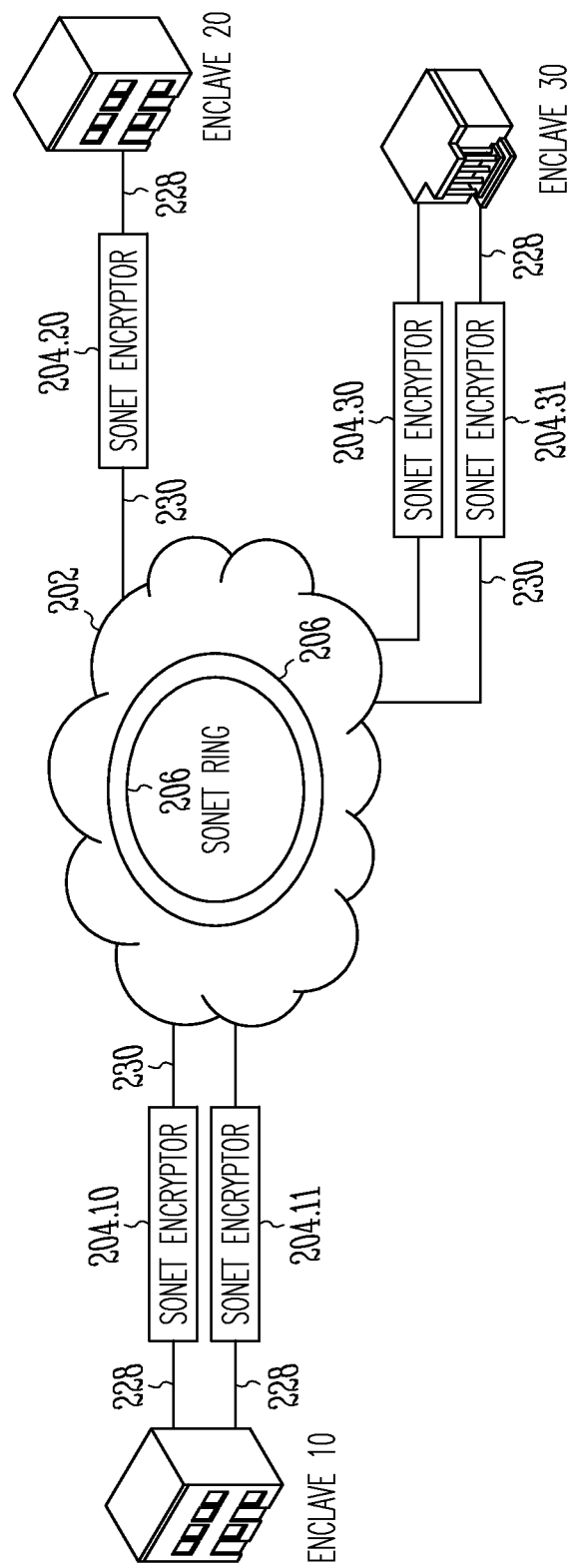
FIG. 13 illustrates one example embodiment of a self-healing SONET-based network.

In some embodiments, encryptors 104 other than HAIPE encryptors are use. In one such approach, the self-healing techniques described above are applied to encryptors based on the Synchronous Optical Network standard (SONET). An example embodiment of a self-healing network 100 based on SONET encryptors 204 is shown in FIG. 13. In the example embodiment shown in FIG. 13, CT network 202 is a SONET network and SONET encryptors are used to protect each enclave. Other network technology can be used as well, including, for example, Ethernet. (In the Ethernet case, encryptors 204 become, for instance, Ethernet link encryptors.)

In the embodiment shown in FIG. 13, ciphertext links 230 are provided to connect each encryptor 204 to ciphertext network 202. In the example embodiment shown in FIG. 14, SONET network 202 is connected through the ciphertext links 230 of one or more SONET encryptors 204 to computing devices within each enclave. In the example embodiment of FIG. 13, two SONET encryptors 204.10 and 204.11 provide redundant pathways through plaintext links 228 into enclave 10, while two SONET encryptors 204.30 and 204.31 provide redundant pathways through plaintext links 228 into enclave 30. Enclave 20 is connected to network 202 through a single plaintext link 228 of encryptor 204.20.

In the example shown in FIG. 13, two rings 206 provide redundancy. In most SONET deployments, rings are used to provide a level of survivability. Some ring topologies use bi-directional line switched rings to provide separate, geographically diverse, data paths. Regardless of the topology, however, once an encryption device such as encryptor 204 is inserted in the system, there is a loss of knowledge as to the state of the SONET link in the network when viewed from the protected enclave. In one embodiment, CT-to-PT Disable is used as noted above to overcome this problem.

Figure 14:
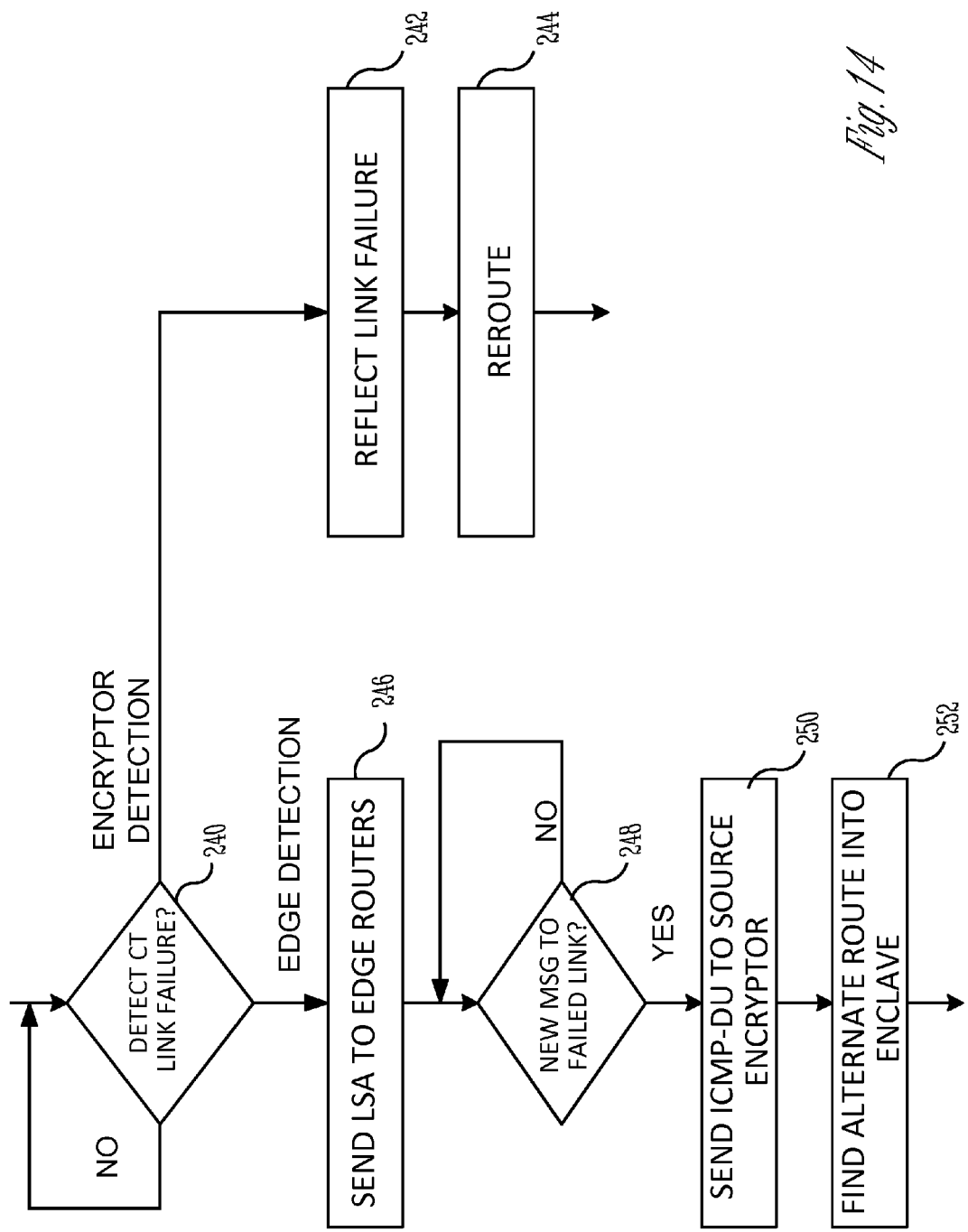
FIG. 14 illustrates one example method of recovering from a CT link failure in a black core network.

In one embodiment, as is shown in FIG. 14, SONET encryptors 204 include CT-to-PT disable and an equivalent ICMP-DU signaling methodology. In the example embodiment shown in FIG. 14, at 210, a check is made at 240 to detect CT link failure. If a CT link 130 fails, it will be detected by both the encryptor 104 connected to the link 230 and by CT network 202. In one example embodiment, an edge router (not shown) in SONET network 202 detects the CT link failure.

On detection of the failure of CT link 230 by encryptor 204.10, encryptor acts, at 242, to reflect the CT link failure by disabling the plaintext link 228 to enclave 10. A device such as a router or computing device detects that plaintext link 228 is disabled and fails over, at 244, to route its traffic out a backup path through the plaintext link 228 of another encryptor 204 (e.g., encryptor 204.11).

Likewise, when CT network 202 detects failure of CT link 230, CT network 202 sends, at 246, an in-band signaling message equivalent to a Link State Advertisement to all other SONET switches in network 202 indicating that the path to encryptor 204.10 is no longer available. Each edge router that receives the State Advertisement notes the broken CT link and monitors, at 248, for subsequent network traffic addressed to the encryptor 204.10 associated with that failed CT link 230. If network traffic addressed to the encryptor 204.10 associated with that failed CT link 230 are subsequently received at an edge of network 202, that edge responds, at 250, with an Internet Control Message Protocol-Destination Unreachable (ICMP-DU) to its adjacent encryptor 204 (e.g., encryptor 204.30). In one embodiment, the traffic is then discarded.

When an encryptor 204 receives an ICMP-DU in response to t network traffic it initiated, it knows that the CT link associated with that path has failed. It will then try a different route, if available, at 252. In one such embodiment, encryptors 204 maintain plaintext network topology tables and ciphertext network topology tables (not shown) similar to those shown in FIG. 6.

In one embodiment, upon receiving ICMP-DU, source SONET encryptor 204 will route to an alternate SONET encryptor 204, if an alternate route exists and is reachable in its ciphertext network topology table, or will probe to discover an alternate route.

As in the example embodiment discussed for HAIPE networks in FIGS. 9, 10*a* and 10*b* above, peer discovery and CT network topology tables can be used effectively to quicken self-healing. In the example shown in FIGS. 10*a* and 10*b*, encryptors 104 are HAIPE 3.1 devices capable of building Peer Enclave Prefix Tables (PEPTs) via Peer Discovery. In some such embodiments, HAIPE encryptors 104 use a multicast mechanism to perform Peer Discovery. Similar mechanisms can be used in the SONET encryptors 204 of network 202.

In one example embodiment, SONET encryptors 204 implement the plaintext link failure recovery method of FIG. 7A.

In one example embodiment, SONET encryptors 204 implement the plaintext network route update method of FIG. 7B.

In addition, in some embodiments, network communication operates seamlessly in both red and black domains for low latency, point to point and multipoint. What that means is, whether sending information just in the black or unclassified, or sending encrypted red traffic through network 102, they all have to have the same capabilities in terms of multicast and unicast capabilities. For multicast, a mechanism is used to distribute keys for decrypting the multicast messages at each of their destinations.

In one embodiment, in order to do multipoint communication, network 100 includes a mechanism for sharing the key amongst all subscribers or participants in that multipoint. In one such embodiment, this is done with preplaced keys that get changed on a periodic basis. That allows us to then run multicast in the network 100.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, network 100 may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An encryptor device for sending network communications between a plaintext network and a ciphertext network, the encryptor device comprising:
   a plaintext interface in communication with a plaintext network, the plaintext interface configured to receive a plaintext network communication packet from the plaintext network;
   a ciphertext interface in communication with a ciphertext network, the ciphertext interface configured to send an encrypted network communication packet to the ciphertext network;
   an encryption module in communication with the plaintext interface and the ciphertext interface, the encryption module configured to encrypt the received plaintext network communication packet to obtain the encrypted network communication packet; and
   a link failure handler in communication with the plaintext interface and the ciphertext interface, the link failure handler configured to:
   detect a failure in a first communication link established between the ciphertext interface and the ciphertext network;
   in response to the detected failure, disable a second communication link established between the plaintext interface and the plaintext network, the second communication link being a different communication link than the first communication link; and
   set a flag in a plaintext topology table of the encryptor device, wherein:
   the plaintext topology table lists a plurality of plaintext network communication routes for the encryptor device; and
   the flag set in the plaintext topology table overrides at least one network communication route selected from the plurality of network communication routes.

2. The encryptor device of claim 1, wherein the link failure handler is further configured to:
   send a network communication packet to a router of the plaintext network in response to the detected failure.

3. The encryptor device of claim 1, wherein the link failure handler is further configured to:
   send a network communication packet to a computing device in communication with the plaintext interface in response to the detected failure.

4. The encryptor device of claim 1, wherein the link failure handler includes:
   a plaintext network topology table that includes a plurality of network communication routes for the plaintext network; and
   a ciphertext network topology table that includes a plurality of network communication routes for the ciphertext network.

5. A network, comprising:
   an unclassified network; and
   a plurality of red networks, wherein at least one red network includes one or more computing devices connected to an encryptor device, the encryptor device comprising:
   a plaintext interface in communication with a router of the at least one red network and configured to receive a plaintext network communication packet from the router;
   a ciphertext interface in communication with the unclassified network and configured to send an encrypted network communication packet to the unclassified network;
   an encryption module in communication with the plaintext interface and the ciphertext interface, the encryption module configured to encrypt the received plaintext network communication packet to obtain the encrypted network communication packet; and
   a link failure handler in communication with the plaintext interface and the ciphertext interface, the link failure handler configured to:
   detect a failure in a first communication link established between the ciphertext interface and the unclassified network;
   in response to the detected failure, disable a second communication link established between the plaintext interface and the at least one red network, the second communication link being a different communication link than the first communication link; and set a flag in a plaintext topology table of the encryptor device, wherein:
the plaintext topology table lists a plurality of plaintext network communication routes for the encryptor device; and
the flag set in the plaintext topology table overrides at least one network communication route selected from the plurality of network communication routes.

6. The network of claim 5, wherein the computing devices detect failure of the plaintext interface and reroutes accordingly.

7. The network of claim 5, wherein:
the encryptor device is a first encryptor device; and further comprising:
a second encryptor device configured to receive and send network communication traffic intended for the first encryptor device, the second encryptor device being activated in response to a determination by at least one computing device that a failure has occurred in the first communication link.

8. The network of claim 5, wherein the at least one red network includes a primary encryptor device and a backup encryptor device, the primary encryptor device and the backup encryptor device each being connected between the router and the unclassified network, wherein:
the primary encryptor device indicates a failure in its communication link established between its ciphertext interface and the unclassified network through its plaintext interface in communication with the router; and
the one or more computing devices become aware of the failure in the primary encryptor device and reroute network traffic to the backup encryptor device.

9. The network of claim 8, wherein the indication is a flag set in the encryptor device.

10. The network of claim 5, wherein the computing devices are connected to a plurality of encryptor devices through one or more routers.

11. The network of claim 10, wherein:
each encryptor device disables its plaintext interface to reflect a failure in its communication link established between its ciphertext interface and the unclassified network; and
one of the routers detects failure of the plaintext interface and reroutes accordingly.

12. The network of claim 10, wherein:
the at least one red network includes a primary encryptor device and a backup encryptor device, the primary encryptor device and the backup encryptor device each being connected between the router and the unclassified network;
the primary encryptor device disables its plaintext interface to indicate a failure in its communication link established between its ciphertext interface and the unclassified network through its plaintext interface in communication with the router; and
the router detects failure of the plaintext interface to the primary encryptor device and reroutes traffic to the backup encryptor device.

13. The network of claim 5, wherein one of the red networks includes a processing center, wherein the processing center includes N servers and N encryptor devices,
wherein each encryptor device is connected to all N servers through a mesh network.

14. The network of claim 5, wherein one of the red networks includes a processing center, wherein the processing center includes N servers and N encryptor devices,
wherein each encryptor device is connected through routers to each of the N servers.

15. A method for sending network communications between a plaintext network and a ciphertext network, the method comprising:
receiving, by a plaintext interface in communication with a plaintext network, a plaintext network communication packet from the plaintext network;
encrypting, by an encryption module, the received plaintext network communication packet to obtain an encrypted network communication packet;
sending, by a ciphertext interface in communication with a ciphertext network, the encrypted network communication packet to the ciphertext network;
detecting a failure in a first communication link established between the ciphertext interface and the ciphertext network;
in response to the detected failure, disabling a second communication link established between the plaintext interface and the plaintext network, the second communication link being a different communication link than the first communication link; and
setting a flag in a plaintext topology table of the encryptor device, wherein:
the plaintext topology table lists a plurality of plaintext network communication routes for the encryptor device; and
the flag set in the plaintext topology table overrides at least one network communication route selected from the plurality of network communication routes.

16. The method of claim 15, further comprising:
sending a network communication packet to a router of the plaintext network in response to the detected failure.

17. The method of claim 15, further comprising:
sending a network communication packet to a computing device in communication with the plaintext interface in response to the detected failure.

* * * * *